United States Patent [19]
George

[11] Patent Number: 5,946,668
[45] Date of Patent: *Aug. 31, 1999

[54] SYSTEM AND METHOD FOR FUNDING A HOME INVESTMENT TRUST

[75] Inventor: J. Dean George, 32-A Hilten Pl., Greensboro, N.C. 27409

[73] Assignee: J. Dean George, Greensboro, N.C.

[ * ] Notice: This patent issued on a continued prosecution application filed under 37 CFR 1.53(d), and is subject to the twenty year patent term provisions of 35 U.S.C. 154(a)(2).

[21] Appl. No.: 08/543,851

[22] Filed: Oct. 12, 1995

[51] Int. Cl.⁶ .......................... G06F 17/60; G06F 157/00
[52] U.S. Cl. ................................ 705/38; 705/36; 705/31
[58] Field of Search .................................. 395/201, 230, 395/231, 235, 236, 238, 240, 234, 219; 705/1, 30, 31, 35, 36, 38, 40, 34, 19; 235/375, 376, 379

[56] References Cited

U.S. PATENT DOCUMENTS

| | | | |
|---|---|---|---|
| 4,722,055 | 1/1988 | Roberts | 705/36 |
| 4,742,457 | 5/1988 | Leon et al. | 705/35 |
| 4,752,877 | 6/1988 | Roberts et al. | 705/35 |
| 4,876,648 | 10/1989 | Lloyd | 705/38 |
| 4,890,228 | 12/1989 | Longfield | 705/31 |
| 4,953,085 | 8/1990 | Atkins | 705/36 |
| 5,193,057 | 3/1993 | Longfield | 705/31 |
| 5,644,727 | 7/1997 | Atkins | 705/40 |
| 5,673,402 | 9/1997 | Ryan et al. | 705/36 |
| 5,689,649 | 11/1997 | Altman et al. | 705/36 |
| 5,724,523 | 3/1998 | Longfield | 705/38 |
| 5,832,461 | 11/1998 | Leon et al. | 705/35 |
| 5,852,811 | 11/1998 | Atkins | 705/36 |
| 5,864,828 | 1/1999 | Atkins | 705/38 |

*Primary Examiner*—Joseph Thomas
*Attorney, Agent, or Firm*—Rhodes Coats & Bennett, L.L.P.

[57] ABSTRACT

A system and method for funding a home investment trust program to provide for home mortgage payments to pay for a home throughout the mortgage period, a first trust fund and a cash-out amount payable during the mortgage period useable for college expenses, and a second trust fund payable at the end of the mortgage period for retirement, wherein funding for the trust comes substantially from income tax savings associated with deducting interest paid on a home mortgage. The invention includes determining the purchaser's tax liability and any tax refund or reduction due to the deduction attributable to interest paid on the home mortgage. The latter amount is systematically deposited into a trust fund. At a point during the mortgage period, the home maybe refinanced in a manner allowing the homeowner to "cash-out" part of the equity build-up. After refinancing, the homeowner will continue funding another trust with income tax deductions attributable to the interest paid on the home mortgage.

17 Claims, 7 Drawing Sheets

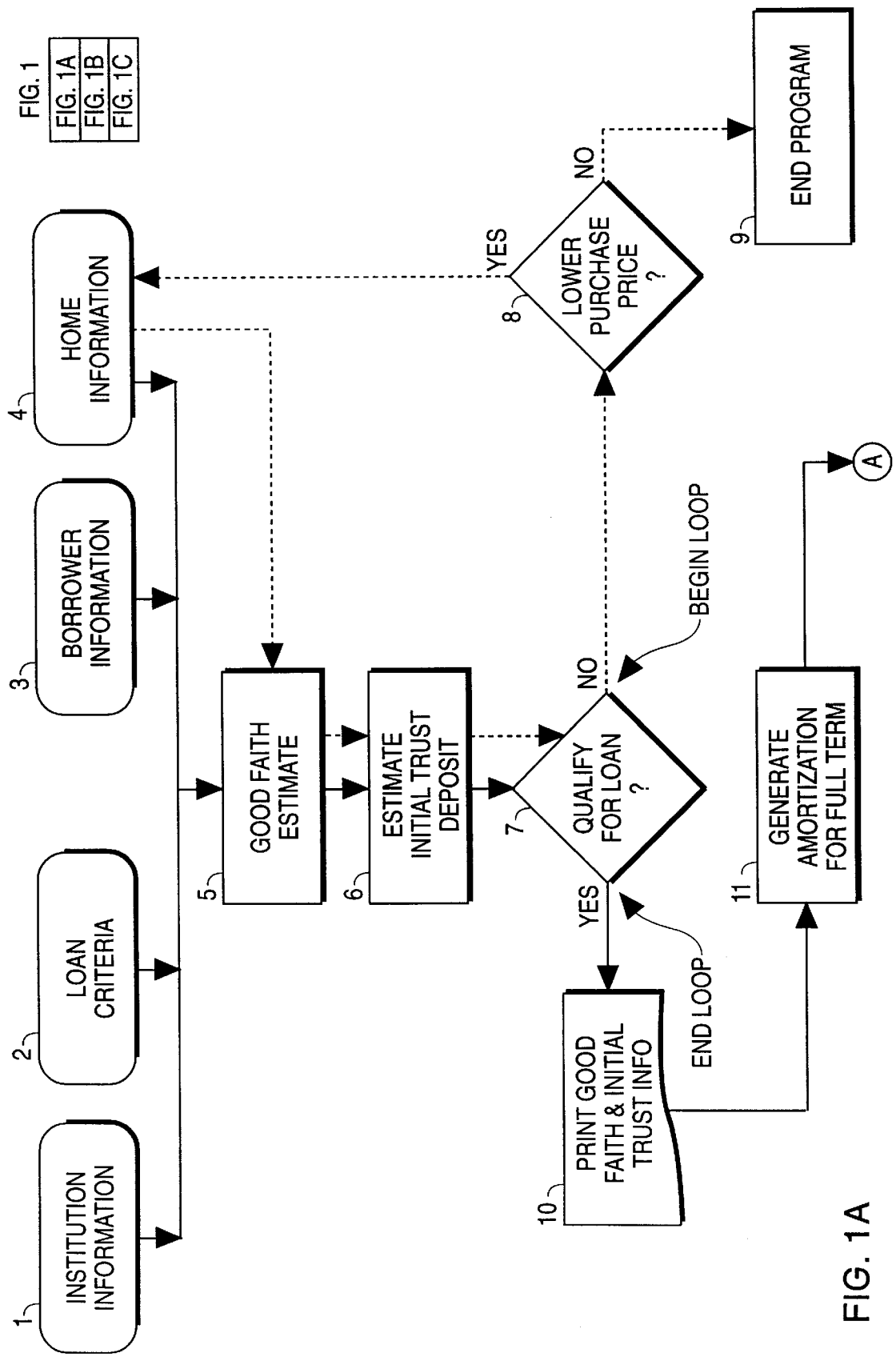

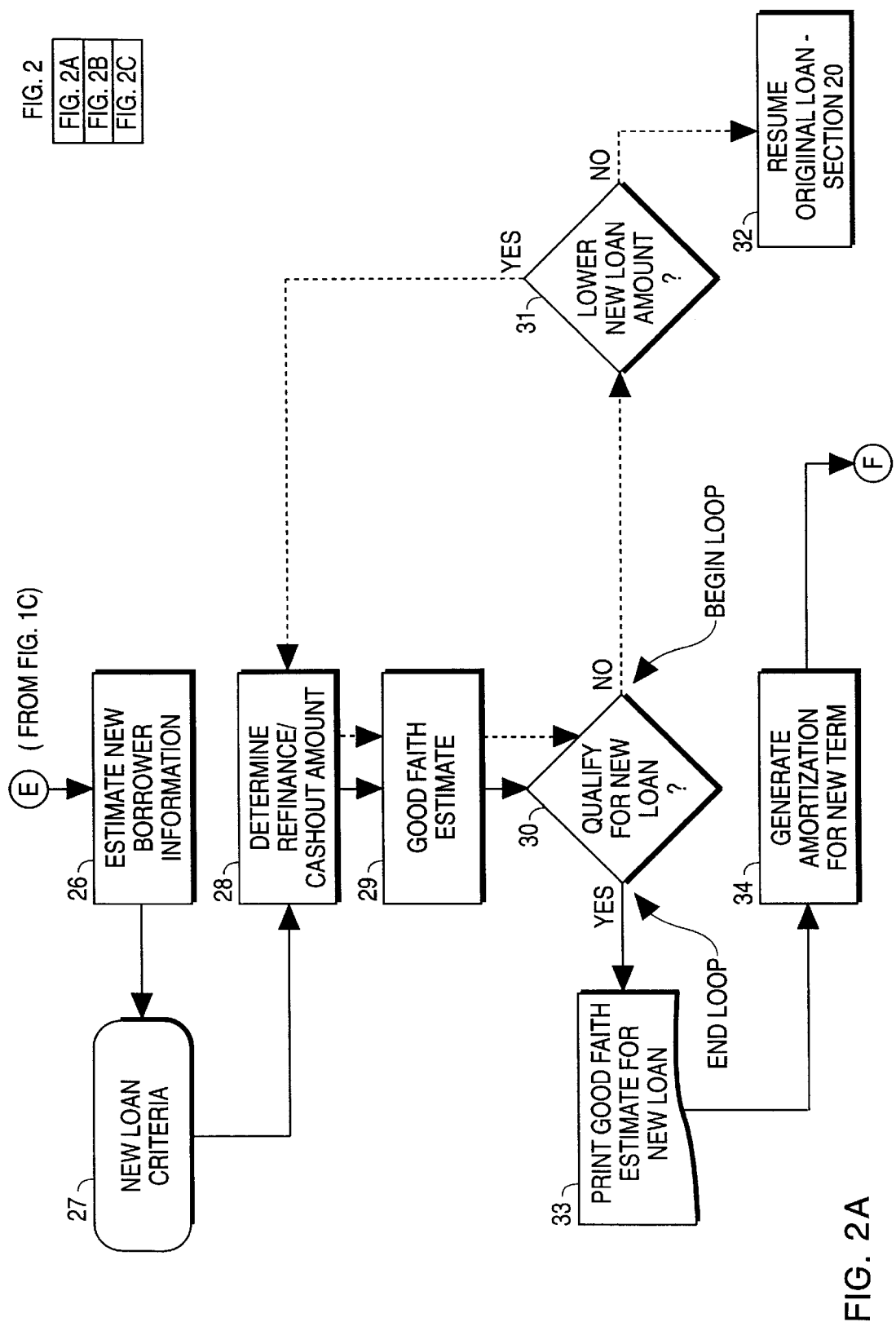

SYSTEM AND METHOD FOR FUNDING A HOME INVESTMENT TRUST

BACKGROUND OF THE INVENTION

The present invention relates generally to administering a program to provide for home mortgage payments, a trust fund, and a cash reserve payable at some point in time during the mortgage period. The funding for the trust comes substantially from income tax savings associated with home mortgage deductions.

Generally, low income families experience difficulty in purchasing a home and providing a college savings fund. Many factors over and above the lack of monetary funds contribute to this problem. Investing and investing programs are generally tailored to the higher income family. Therefore, there are few available methods or systems to help facilitate owning a home and creating a college savings fund. Furthermore, lower income families generally have a higher immediate need for their take-home income. This need often results in economic decisions which are counter to prudent investment principles. In short, when money is tight, it is often very easy to overlook the future for the short term.

Given the lack of investment methods or systems for low income families, these families often have to choose between a home or savings for their children's education or do without both. When the parents neglect to save for their children's college education, the likelihood of the children being able to attend college significantly decreases. When the children don't attend college, the likelihood of another low income generation is also greatly enhanced. However, it is not difficult to understand how these families choose to buy a home when home ownership is such a staple in the American society.

The parents in these families should also consider their own future. Many families, especially those of lower means, neglect to adequately prepare for retirement. Therefore, it is of equal necessity, not only to prepare for college and buy a home, but to secure a retirement fund for the family's later years.

Thus, there remains a need for a new method or system to provide a mechanism to facilitate home ownership, college savings, and a retirement fund in an economical and affordable way without significantly affecting the family's standard of living.

SUMMARY OF THE INVENTION

The invention provides a system and method for administering a program to provide for home mortgage payments to pay for a home throughout the mortgage period, a first trust fund and a cash-out amount payable during the mortgage period useable for college expenses, and a second trust fund payable at the end of the mortgage period for retirement, wherein funding for the trust comes substantially from income tax savings associated with deducting interest paid on a home mortgage. The invention includes determining the purchaser's tax liability and any tax refund or reduction due to the deduction attributable to interest paid on the home mortgage. The latter amount is systematically deposited into a trust fund. At a point during the mortgage period, the home maybe refinanced in a manner allowing the homeowner to "cash-out" part of the equity build-up. After refinancing, the homeowner will continue funding another trust with income tax deductions attributable to the interest paid on the home mortgage.

Accordingly, one aspect of the present invention is to provide a system to help facilitate investing in a trust fund while maintaining the ability to gain access to a significant amount of cash for a future need.

Another aspect of the invention is to provide a college trust fund, and a sum to supplement the college trust fund when the children start college, and additionally provide for a retirement trust fund.

These and other aspects of the present invention will become apparent to those skilled in the art after a reading of the following description of the preferred embodiment when considered with the drawings.

DETAILED DESCRIPTION OF THE PREFERRED EMBODIMENT

The present invention enhances the ability of low income families to realize "the American Dream" of owning a home, provide assistance for the children's college, and provide a retirement investment vehicle. In accordance with the invention, when a low income family purchases a home, often with some governmental assistance, the income tax savings attributed to interest paid on the home mortgage is deposited into a trust fund. The fund may take the form of a college savings fund. For example, if the fund is a college savings fund, the fund is scheduled to mature when college expenses are expected. By refinancing the home at this point, the equity build-up due to principle reduction and home appreciation can be "cashed out" to provide an additional amount of money to supplement the college savings fund. In addition, the family can continue to use the interest deduction savings to build a retirement fund.

Referring to FIG. 1, a preferred embodiment of the operation of the system of the present invention is depicted as a flow chart. FIG. 1 depicts the process and flow for the initial loan starting at year one. Initially, all information necessary for determining whether a loan applicant qualifies for a mortgage is entered. Once all of the required information is entered, the program qualifies or disqualifies the potential borrower for the loan requested. If the borrower does not qualify, the program permits entry of data reflecting a lowering of the purchase price until the borrower qualifies for the loan.

Figure 3:
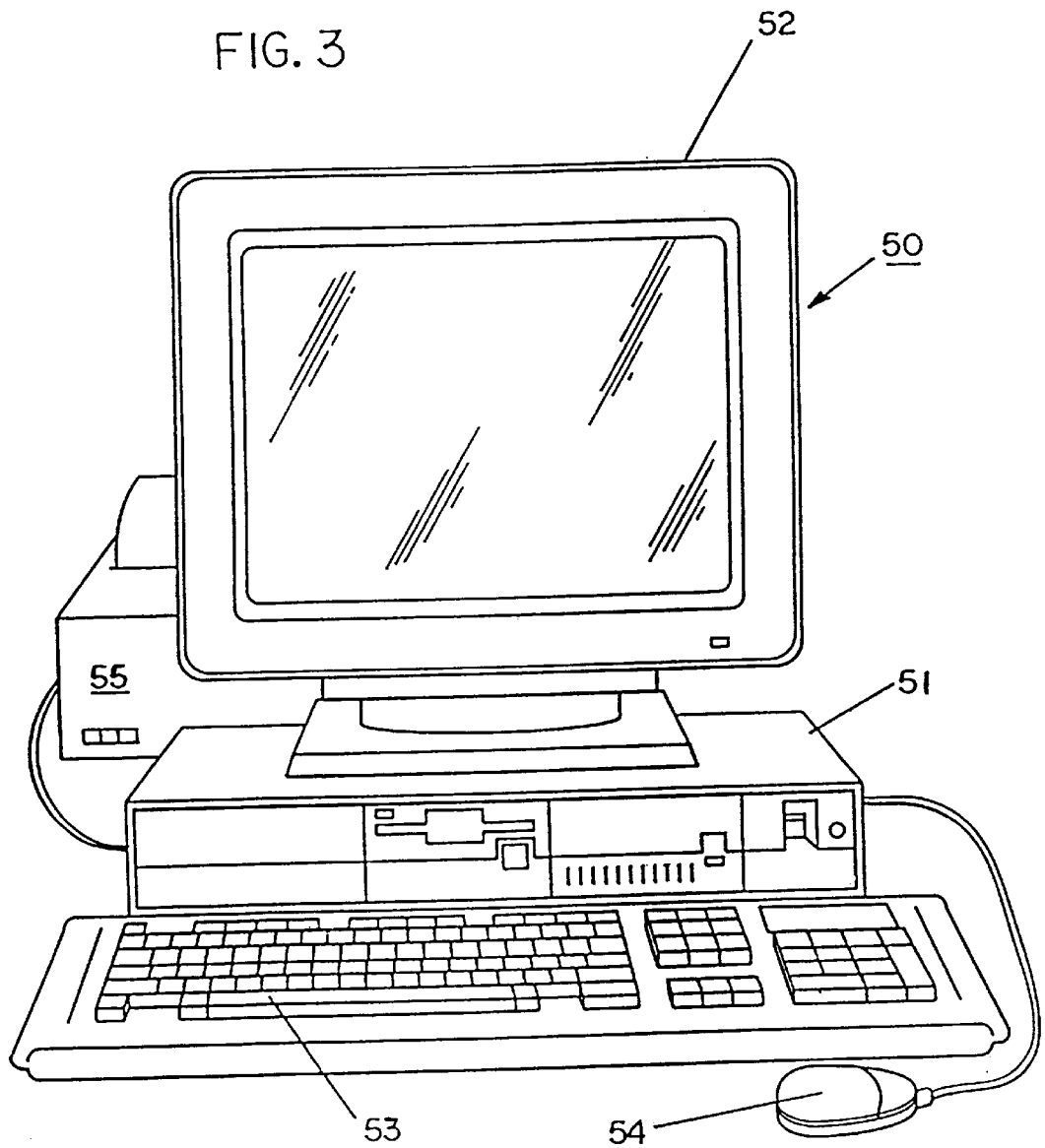
FIG. 3 shows a computer or data processing system to administer the program.

In further detail, various information regarding the lending institution is entered in block 1, loan criteria is entered in block 2, borrower information is entered in block 3, and home information is entered in block 4. As seen in FIG. 3, this information may be entered into computer 50 via keyboard 53, or with the assistance of mouse 54, in conventional fashion. This data is stored in a memory unit and available for manipulation by a microprocessor in central processing unit 51 of computer 50. The calculations and computations described herein are carried out by these components, suitably programmed.

The data entered are used to make a good faith estimate in processing block 5 of the total monthly PITI payments (including principle, interest, taxes and insurance), actual loan amount (purchase price times loan-to-value (LTV)), final closing costs, and escrows and impounds. The lending institution information 1 includes loan servicing fees, trust administration fees, loan origination/processing fees, interest rate bump, and any other fees required at closing. The loan criteria includes information relevant to the underwriting of a loan such as the debt-to-income ratios, loan-to-value factor (LTV), annual interest rate, available terms, type of loan (fixed or variable), credit rating, acceptable sources of down payment/closing costs, and required pre-paid costs (mortgage insurance) etc. The borrower information typically includes gross income, total debts, income tax filing status, credit rating, assumed annual cost of living increases, and total assets. The relevant home information usually includes the purchase price, appraised value, size, and projected annual appreciation.

Based on the good faith estimate calculated in block 5, the system determines the amount of money left over after closing to use as an initial trust deposit in processing block 6. Contributions from the home builder, realtor and government, along with sweat equity, may contribute to the closing costs and the initial trust deposit.

The system decides whether or not the borrower qualifies for the loan in decision and processing block 7 according to the monthly payment calculated in the good faith estimate in conjunction with the loan criteria. If the borrower fails to qualify for the loan, a loop is entered, which continues through decision block 8 until either the purchase price is lowered to a level in which the borrower qualifies, or the system operator elects to end the program at block 9. Those of ordinary skill in the art will recognize that lowering the purchase price is only one of various ways to lower the actual loan amount and monthly payments, within the scope of applicant's invention. Others of the inputs from blocks 1–4 may also be modified. If the borrower qualifies for the loan in decision block 7, a report is generated in printer loop 10 detailing the results of the good faith estimate from block 5 and the estimated initial trust deposit calculated in block 6. FIG. 3 shows printer 55 on which the report may be generated.

Once the borrower qualifies for the loan in decision block 7, an amortization schedule is generated in processing block 11 based on the initial term of the mortgage (typically 30 years), interest rate and loan amount.

The system next accesses stored state and federal tax tables in block 12 containing tax rates corresponding to incomes, filing statuses, mortgage interest deductions and dependent deductions entered previously. Using the tax tables in block 12, the system determines the appropriate income tax refund in processing block 13 taking into consideration all deductions including the mortgage interest deduction.

The system next calculates the annual trust deposit in processing block 14 for each year of the original loan. The annual trust deposit is calculated as the amount of income tax savings attributable to the mortgage interest deduction. The annual trust deposits are added to the initial trust deposit in processing block 6 made the first year. The annual trust investment rate stored in block 15 is entered the first year and, depending on the trust fund, may be adjusted each year. The system next calculates the trust value in processing block 16 based on prior trust deposits calculated in block 14 and the annual trust investment rate from block 15. The system then calculates any institutional fees in processing block 17, such as, loan servicing fees, tax administration fees, etc.

At this point, the system decides whether it is the end of the term in decision block 18 (i.e. the completion of the 30 year mortgage term or a shorter selected period). If it is not, the system either begins an annual loop at the end of the first year of the term, or continues the annual loop started at the end of the first year. If the processing has parsed the annual loop a sufficient number of times so that the mortgage has come to the end of the original mortgage term and the borrower has previously chosen not to continue the plan in decision block 19, then a trust payout to the homeowner is calculated in block 23. A cost/benefit analysis is generated in processing block 24 summarizing the total equity/cash position and total cost of funds of the borrower at the end of the term. A final report is then prepared for the borrower and lending institution in block 25.

As noted above, the system recurses an annual loop at the end of the first year of the term. Within this annual loop, the system checks to see if the borrower wants to enter the plan continuation phase in decision block 19. Typically the borrower does not enter the plan continuation until they are ten to fifteen years into the mortgage term (or a time corresponding to the expected need of education costs). Within the annual loop, the system estimates and updates the appreciated home value in block 20 and estimates a cost of living increase for income in block 21. The new income estimate is used to determine the appropriate state and federal tax tables in block 12 to help determine the state and federal tax refund in processing block 13 in the next passing of the loop. The loop continues in this manner until reaching the borrower's election of end of term. Upon election of plan continuation in decision block 19, there is a trust payout to the homeowner in block 22. As noted above, this generally occurs around the ten to fifteen year mark.

If there is a payout, the plan can continue with a refinancing to provide new savings accumulation for retirement. Now referring to FIG. 2, the system starts a process very similar to the above process with only a few variations. The system initially estimates new borrower information in processing block 26, based upon cost of living increases added to gross income during the original loan, along with a new home value based on estimated appreciation. New loan criteria are entered in block 27 to help determine a refinancing and cash-out amount for the new loan in processing block 28. The refinancing amount is typically 80% of the home value and the cash-out amount is the refinancing amount less the balance owed from the original loan and any other associated closing costs. The cash-out amount is a sum in addition to the first trust payout.

A good faith estimate of the monthly payment is calculated in block 29 based on the refinancing and cash-out data. At this point, the system decides whether or not the borrower qualifies for the new loan in decision block 30 according to the monthly payment calculated in the good faith estimate in conjunction with the new loan criteria. If the borrower fails to qualify for the loan, a loop is entered, which continues until either the loan amount is lowered in block 31 to a level in which the borrower qualifies, or the system operator elects to resume the original loan in block 32. If the original loan is resumed, there is no cash-out. If the borrower qualifies for the new loan in block 30, a report is, generated in block 33 detailing the results of the good faith estimate from block 29 for the new loan.

Once the borrower qualifies for the new loan, an amortization schedule is generated in printer block 34 based on the new term of the mortgage, interest rate and loan amount.

The system next accesses stored state and federal tax tables in block 35 containing tax rates for all incomes, filing statuses, mortgage interest deductions and dependent deductions. Using the tax tables in block 35, the system determines the appropriate tax refund in processing block 36 taking into consideration all deductions including the mortgage interest deduction.

The system next calculates a second annual trust deposit in processing block 37 for each year of the original loan, the trust value is calculated in block 38 based on prior trust deposits stored in block 37, and any institutional fees stored in block 39, such as, loan servicing fees, tax administration fees, etc. At this point, the system decides whether it is the end of the term in decision block 40. If it is not, the system either begins an annual loop at the end of the first year of the new term, or continues the annual loop started after qualifying for the new loan. If the mortgage has come to the end of the mortgage term, there is a second trust payout in block 43. A cost/benefit analysis is generated in processing block 44 summarizing the total equity/cash position and total cost of funds of the borrower at the end of the term. A final report is then sent to the borrower and lending institution in block 45.

As noted above, the system begins an annual loop after qualifying for the new loan. Within the annual loop, the system estimates and updates the appreciated home value in processing block 41 and estimates a cost of living increase for income in block 42. The new income estimate is used to determine the appropriate state and federal tax tables in block 35 to help determine the state and federal tax refund in processing block 36. The loop continues in this manner until the end of the term is reached in decision block 40.

The first trust fund pay-out in block 22 often is scheduled to coincide with college educations costs. The cash-out amount in block 28 may provide further aid for the education costs. The second trust fund payout in block 43 may provide for retirement. Alternatively, the first trust fund payout amount may be retained in the second trust fund for greater retirement savings.

FIG. 3 depicts a personal computer system 50 programmable with software according to the system discussed above. The personal computer system 50 will often include a computer 51, a monitor 52, a keyboard 53, a mouse 54, and a printer 55. The system may be carried out on any suitable calculating means such as a personal computer, programmable calculator or the like. IBM compatible, MacIntosh and other computers may be used for system implementation. Suitable software can be written by those of ordinary skill in the programming art without undue experimentation.

It should be understood that various modifications and improvements may be carried out in practice. These have been deleted herein for the sake of conciseness and readability, but are properly within the scope of the following claims. For example, the system may be accessed during the lives of the loan and trust to update the projections initially made to reflect unexpected changes in the borrower information, cost of living estimates, income and home appreciation, as well as changes in tax rates and other variables.

What is claimed is:

1. A data processing system for determining home mortgage payments to pay for a home throughout a predetermined period, a first trust fund and a cash-out amount payable after a selected period within the predetermined period, wherein funding for the trusts come substantially from income tax savings associated with deducting interest paid on a home mortgage, said system comprising:

a means for entering mortgage data, income data, and income tax data into memory;

a means for calculating amortization of a first home mortgage over a selected period;

a means for calculating for each fiscal year of the predetermined period:

an income tax refund for a prior fiscal year;

an income tax for a current fiscal year;

an amount of earnings to withhold from income including the income tax payable for the next fiscal year and any amount of income tax savings attributable to home mortgage interest deductions;

an amount of the tax refund to deposit into the trust fund during the selected period, said selected period having an end;

an amount of the trust fund after the tax refund is deposited into the trust fund; and a means for issuing a mortgage based on the amortization of the first home mortgage.

2. A data processing system as claimed in claim 1 further comprising a means for determining refinancing data near the end of the selected period; a means for calculating amortization of a subsequent home mortgage based on the refinancing data when the first payout of the first trust fund is made at the end of the selected period; a means for calculating the cash-out amount, wherein the cash-out amount is substantially determined by subtracting a remaining balance of the first home mortgage from a refinancing amount; and providing for a second trust fund payable at an end of the predetermined period wherein said tax refund for each fiscal year after the selected period and until the end of the predetermined period is deposited into a second trust fund.

3. A data processing system as claimed in claim 1 wherein the predetermined period and the selected period have a coinciding beginning, the predetermined period is 30 years and the selected period is ten years.

4. A data processing system as claimed in claim 1 wherein the predetermined period and the selected period have a coinciding beginning, the predetermined period is 30 years and the selected period is fifteen years.

5. A data processing system as claimed in claim 1 wherein the home has a value determined at the time of refinancing and the refinancing amount is approximately eighty percent of said value.

6. A data processing system as claimed in claim 1 wherein the amount of the tax refund deposited into the trust fund is the amount of income tax savings attributable to the home mortgage interest deductions.

7. A data processing system as claimed in claim 1 wherein part of the first trust fund is deposited into another trust fund after the end of the selected period.

8. A data processing system as claimed in claim 1 further comprising a means to generate reports of information calculated by the system and a printer for printing said reports.

9. A data processing system as claimed in claim 1 further providing for a second trust fund payable at an end of the predetermined period wherein said tax refund for each fiscal year after the selected period and until the end of the predetermined period is deposited into a second trust fund.

10. A data processing system for providing home mortgage payments to pay for a home throughout a predetermined period and a first trust fund and a cash-out amount payable after a selected period within the predetermined period, wherein funding for the trusts come substantially from income tax savings associated with deducting interest paid on a home mortgage, said system comprising:

a data processing apparatus including a data processing terminal for entering mortgage data, income data, and income tax data into memory;

a processor unit programmed for calculating amortization of a first home mortgage over a selected period;

said processor unit further having the capability of calculating for each fiscal year of the predetermined period:

an income tax refund for a prior fiscal year;

an income tax for a current fiscal year;

an amount of earnings to withhold from income including the income tax for the next fiscal year and any amount attributable to home mortgage interest deductions;

an amount of the tax refund to deposit into the trust fund during the selected period, said selected period having an end; and an amount of the trust fund after the tax refund is deposited into the trust fund; and said processor unit further having the capability to determine refinancing data near the end of the selected period, to calculate amortization of a subsequent home mortgage based on the refinancing data when the first payout of the first trust fund is made at the end of the selected period, to calculate the cash-out amount, wherein the cash-out amount is substantially determined by subtracting a remaining balance of the first home mortgage from a refinancing amount, and issue a mortgage based on the amortization of the first home mortgage.

11. A data processing method providing for home mortgage payments throughout a predetermined period, a first trust fund and a cash-out amount payable during the predetermined period, and a second trust fund payable at end of the predetermined period, wherein funding for the trusts come substantially from tax savings associated with deducting interest paid on a home mortgage, said method comprising:

entering mortgage data, income data, and income tax data into the system;

calculating amortization of a first home mortgage over a predetermined period;

repeatedly calculating for each fiscal year of the predetermined period:

an income tax refund for a prior fiscal year;

an estimated income tax for a current fiscal year;

an amount of earnings to withhold from income including the income tax for the next fiscal year and any amount attributable to home mortgage interest deductions;

an amount of the tax refund to deposit into the trust fund during the selected period, the selected period having an end; and an amount of the trust fund after the tax refund is deposited into the trust fund;

determining refinancing data at a point during the predetermined period near the first payout of the first trust fund;

calculating amortization of a subsequent home mortgage, using the refinancing data, when the first payout of the first trust fund is made at the end of the selected period;

calculating the cash-out amount, wherein the cash-out amount is substantially determined by subtracting a remaining balance of the first home mortgage from a refinancing amount; and issuing a mortgage based on the amortization of the first home mortgage.

12. A data processing method as claimed in claim 11 further providing for a second trust fund payable at an end of the predetermined period wherein said tax refund for each fiscal year after the selected period and until the end of the predetermined period is deposited into a second trust fund.

13. A data processing method as claimed in claim 11 wherein the predetermined period has a beginning, the predetermined period is 30 years and the refinancing occurs ten years after the beginning of the predetermined period.

14. A data processing method as claimed in claim 11 wherein the predetermined period has a beginning, the predetermined period is 30 years and the refinancing occurs fifteen after the beginning of the predetermined period.

15. A data processing method as claimed in claim 11 wherein the home has a value determined at the time of refinancing and refinancing amount is approximately eighty percent of said value.

16. A data processing method as claimed in claim 11 wherein the amount of the tax refund deposited into the trust fund is the amount attributable to the home mortgage interest deductions.

17. A data processing method for projecting a program to provide for home mortgage payments throughout a predetermined period, a college trust fund and a college supplement amount payable after a selected period within the predetermined period, and a retirement trust fund payable at end of the predetermined period, wherein funding for the trusts come substantially from tax savings associated with deducting interest paid on a home mortgage, said method comprising:

entering mortgage data, income data, and tax data into the system;

calculating costs associated with financing a home mortgage;

calculating amortization of a first home mortgage over a predetermined period;

calculating for each fiscal year of the predetermined period:

projected changes in income, home appreciation, and costs associated with a first home mortgage, an income tax refund for a prior fiscal year;

an estimated income tax for a current fiscal year;

an amount of earnings to withhold from pay including the income tax for the current fiscal year and any tax savings attributable to home mortgage interest deductions;

an amount of the tax refund to deposit into a trust fund, wherein the trust fund during the selected period is the retirement trust fund; and an amount of the trust fund after the tax refund is deposited into the trust fund; determining projected refinancing data near an end of the selected period; calculating a projected amortization of the subsequent home mortgage, after refinancing for remainder of the predetermined period, when the first payout of the college trust fund is made at the end of the selected period;

calculating the college supplement amount projected at the refinancing, wherein the college supplement amount is substantially determined by subtracting a projected remaining balance of the first home mortgage from a projected refinancing amount; and issuing a mortgage based on the amortization of the first home mortgage.

* * * * *

UNITED STATES PATENT AND TRADEMARK OFFICE
CERTIFICATE OF CORRECTION

PATENT NO : 5,946,668
DATED : August 31, 1999
INVENTOR(S): J. Dean George

Figure 1B:
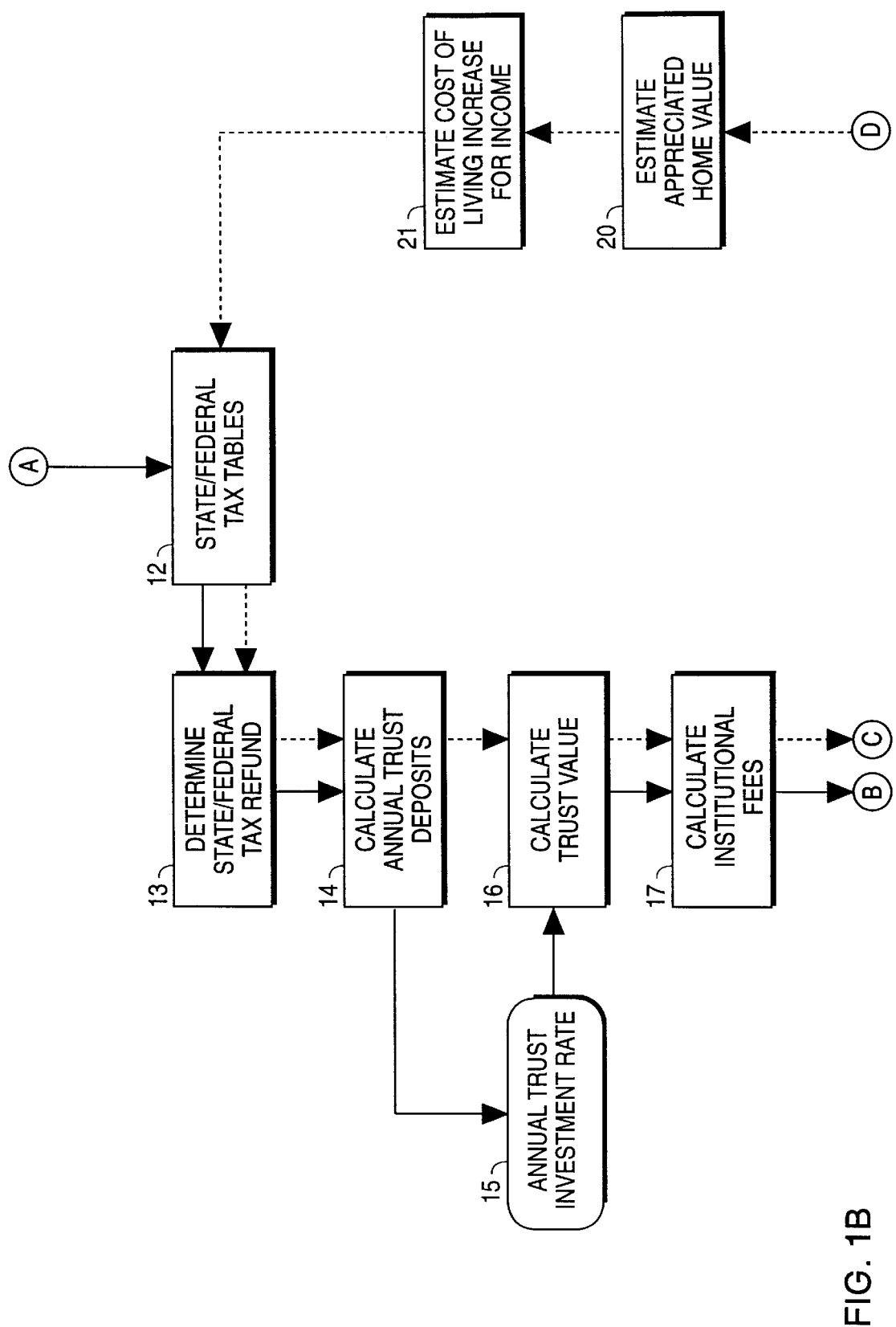
FIG. 1 is a flow chart depicting the data processing system and method in accordance with the principles of a preferred embodiment of the invention.
Figure 1C:
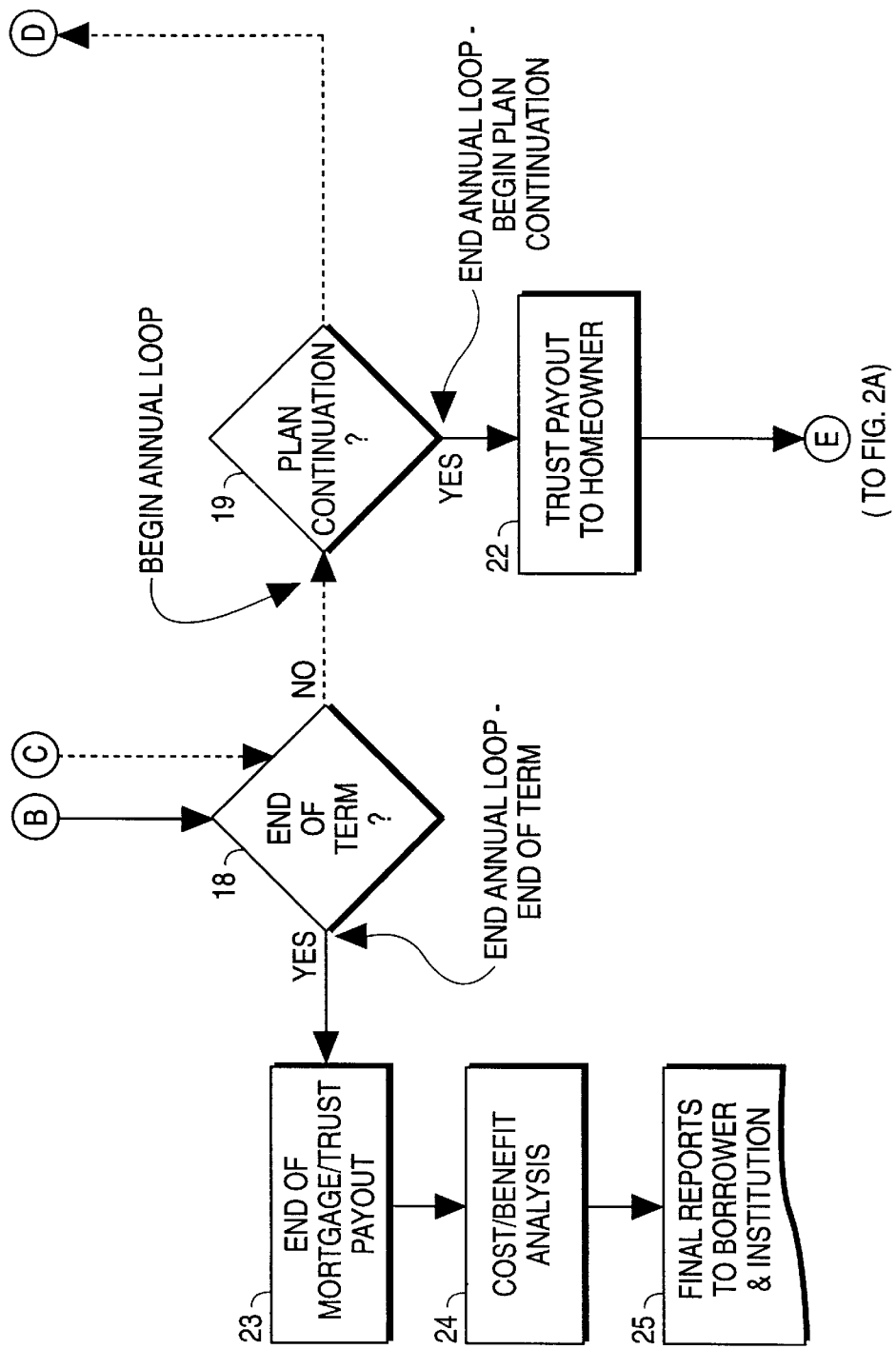

It is certified that error appears in the above-identified patent and that said Letters Patent are hereby corrected as shown below:

At Column 2, line 14, change "Figure 1 is" to --Figures 1A, 1B and 1C (hereinafter referred to as Figure 1) together form--.

Figure 2B:
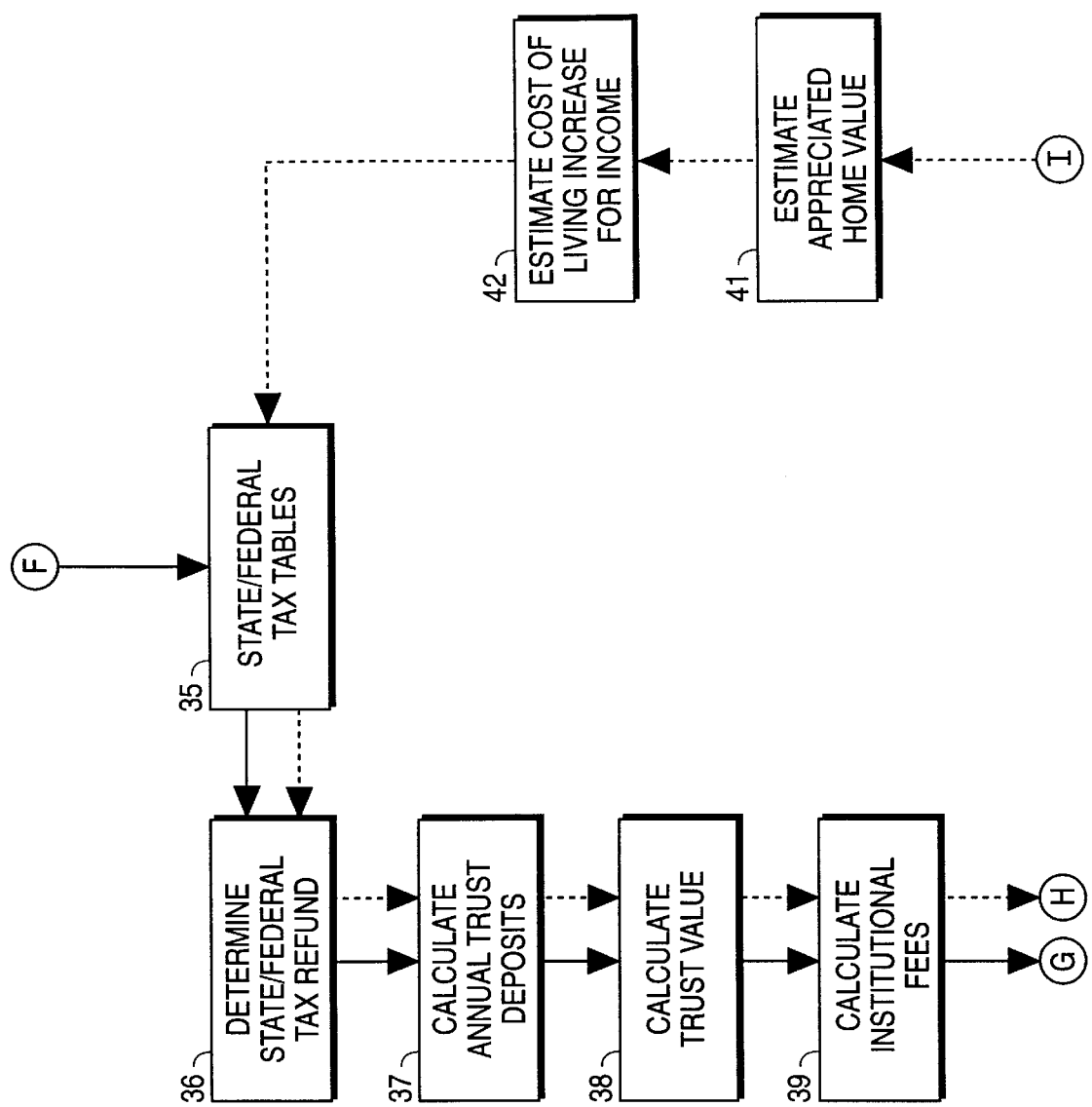
FIG. 2 is flow chart depicting the continuation of the data processing method and system of FIG. 1.
Figure 2C:
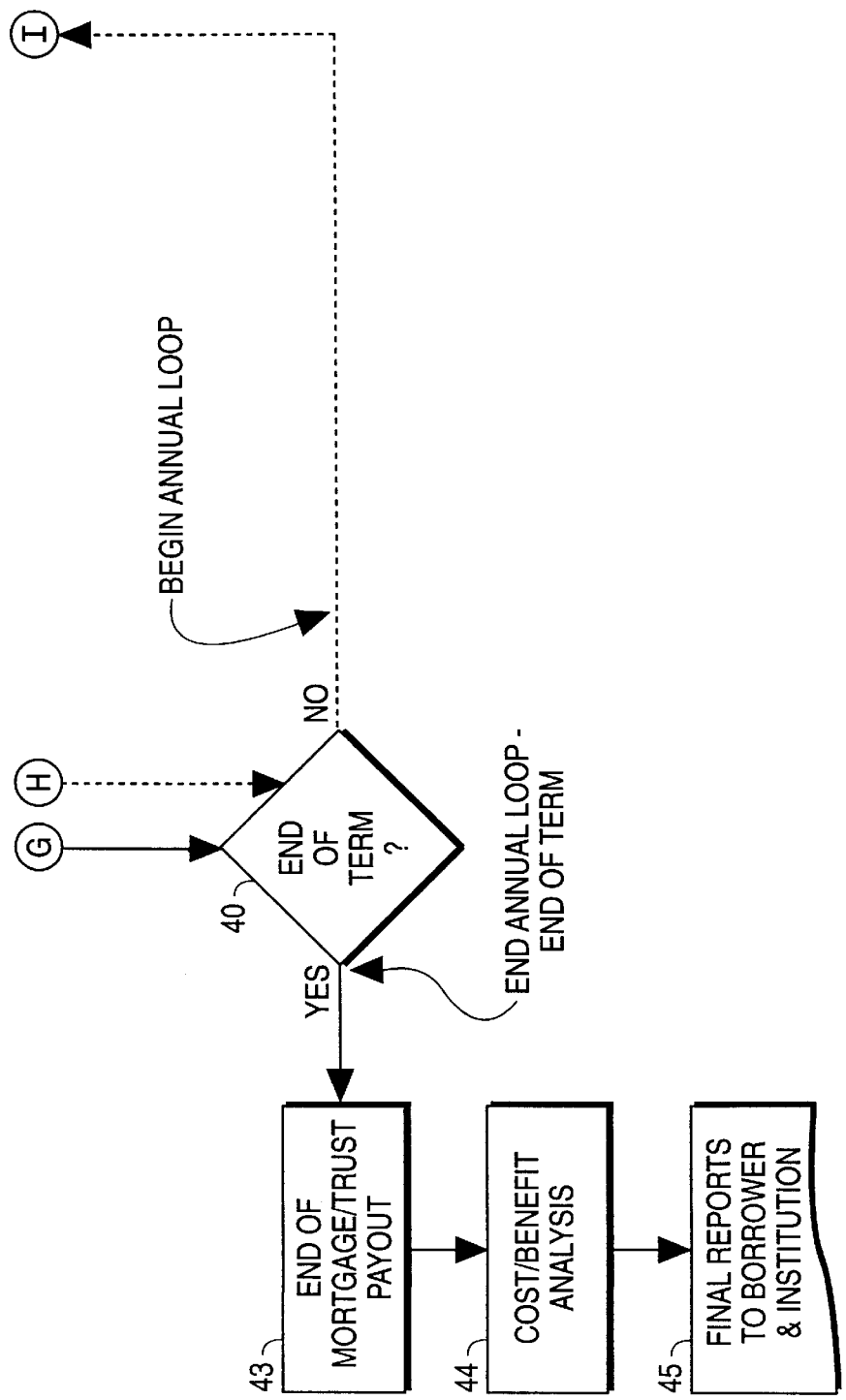

At Column 2, line 17, change "Figure 2 is" to --Figures 2A, 2B and 2C (hereinafter referred to as Figure 2) together form--.

Signed and Sealed this

Eighth Day of February, 2000

*Attest:*

Q. TODD DICKINSON

*Attesting Officer*     *Commissioner of Patents and Trademarks*